United States Patent [19]

Inagaki et al.

[11] Patent Number: 5,355,176
[45] Date of Patent: Oct. 11, 1994

[54] LUMINANCE/CHROMINANCE SIGNAL SEPARATING APPARATUS WHICH ATTENUATES CHROMINANCE SIGNAL BASED ON PHASE CHANGE OF CHROMINANCE SIGNAL

[75] Inventors: Satoru Inagaki, Suita; Yoshihisa Nishigori, Itami, both of Japan

[73] Assignee: Matsushita Electric Industrial Co., Ltd., Osaka, Japan

[21] Appl. No.: 109,997

[22] Filed: Aug. 23, 1993

[30] Foreign Application Priority Data

Oct. 13, 1992 [JP] Japan .................. 4-274635

[51] Int. Cl.5 .............................................. H04N 9/78
[52] U.S. Cl. ..................................... 348/609; 348/666
[58] Field of Search ................ 358/31, 40, 36, 167; 348/609, 610, 665, 666; H04N 9/78, 9/64, 5/213

[56] References Cited

U.S. PATENT DOCUMENTS

| 4,706,112 | 11/1987 | Faroudja et al. ............ 358/31 |
| 4,847,683 | 7/1989 | Lang ........................... 358/37 X |
| 4,951,128 | 8/1990 | Miyake ........................ 348/666 |
| 5,019,895 | 5/1991 | Yamamoto et al. ......... 358/36 X |
| 5,249,040 | 9/1993 | Sugiyama .................... 358/31 |

FOREIGN PATENT DOCUMENTS

| 0224589 | 10/1986 | Japan .................. H04N 9/78 |
| 0093290 | 4/1988 | Japan .................. H04N 9/78 |
| 0038991 | 2/1991 | Japan .................. H04N 9/78 |
| 0044188 | 2/1991 | Japan .................. H04N 9/78 |
| 5037953 | 2/1993 | Japan .................. H04N 9/78 |

Primary Examiner—Mark R. Powell
Assistant Examiner—John W. Miller
Attorney, Agent, or Firm—Wenderoth, Lind & Ponack

[57] ABSTRACT

A comb filter separates a luminance signal and chrominance signal from a composite video signal, a phase calculation circuit calculates a phase delay of the chrominance signal, at least one delay circuit delays an output signal of the phase calculation circuit, a phase difference calculation circuit calculates a difference between an output signal of the phase calculation circuit and an output signal of the delay circuit, and a chrominance signal correction circuit attenuates the chrominance signal in response to an output signal of the phase difference calculation circuit. The chrominance signal having crosstalk from the luminance signal is suppressed to prevent the generation of cross color.

6 Claims, 8 Drawing Sheets

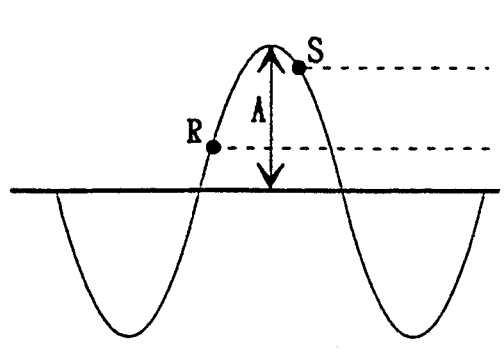
Fig. 5(a)
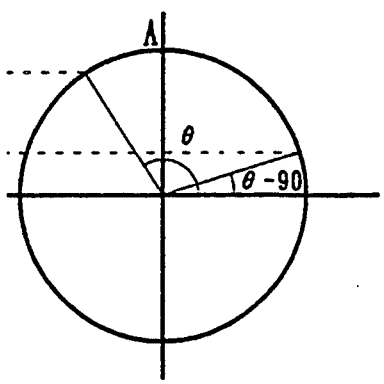
Fig. 5(b)
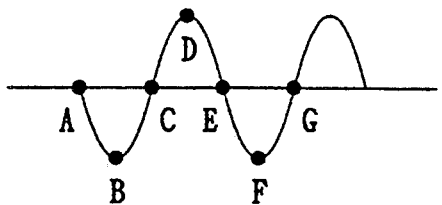
Fig. 6(a)
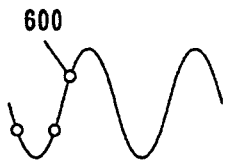
Fig. 6(b)
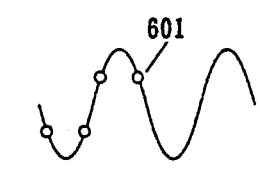
Fig. 6(c)
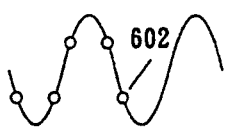
Fig. 6(d)
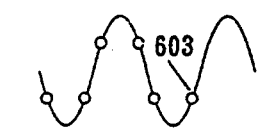
Fig. 6(e)
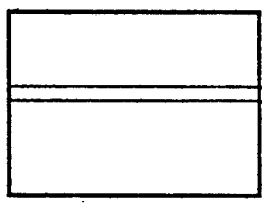
Fig. 7(a)
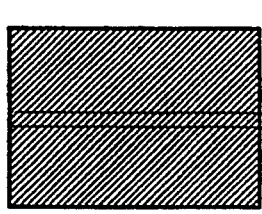
Fig. 7(b)
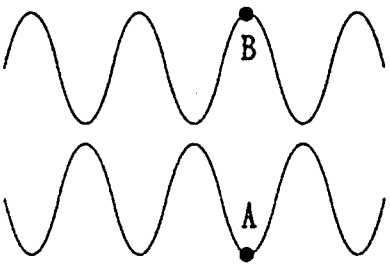

Fig. 8
|  | Input from 204 |
|---|---|
| Input from 205 | Output from Equation 4 |
Fig. 9
|  |  | Input from 206 (P:0~90) |
|---|---|---|
| Input from 214 | 0 | -P+180 |
|  | 1 | P+0 |
|  | 2 | -P+180 |
|  | 3 | P+180 |
|  | 4 | -P+360 |
|  | 5 | P+0 |
|  | 6 | -P+360 |
|  | 7 | P+180 |
Fig. 10
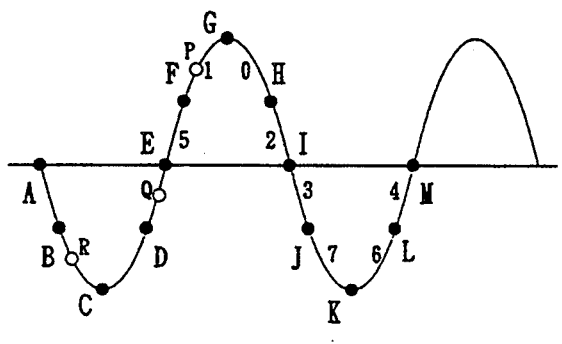
Fig. 11
| | Input from 104 |
|---|---|
| Input from 110 (degree) 0 | ↑ reduce |
| 180 | through |
| 360 | ↓ reduce |
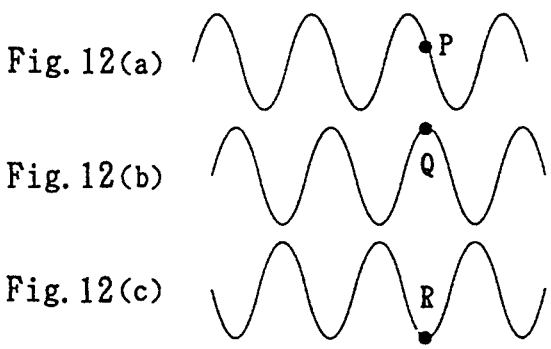
Fig. 12(a)
Fig. 12(b)
Fig. 12(c)

LUMINANCE/CHROMINANCE SIGNAL SEPARATING APPARATUS WHICH ATTENUATES CHROMINANCE SIGNAL BASED ON PHASE CHANGE OF CHROMINANCE SIGNAL

BACKGROUND OF THE INVENTION

1. Field of the Invention

This invention relates to an apparatus for separating a luminance signal and chrominance signal of a composite video signal.

2. Description of the Prior Art

A conventional luminance signal and chrominance signal separating apparatus is shown in FIG. 13 and includes a composite video signal input terminal 1300, a first delay circuit 1301 for delaying an input signal by one line, a second delay circuit 1302 for delaying an output of the first delay circuit further by one line, a correlation detector 1303 for detecting a correlation of the input signal and the output signal of the first delay circuit 1301 and a correlation of the output signal of the first delay circuit 1301 and an output signal of the second delay signal circuit 1302, a first comb filter 1304 for receiving the input composite video signal and the output signal of the first delay circuit 1301, a second comb filter 1305 for receiving the output signal of the first delay signal circuit 1301 and the output signal of the second delay signal circuit 1302, a band-pass filter 1306 for filtering a frequency band of a color subcarrier in the output signal of the first delay circuit 1301, a selection circuit 1307 for selecting one of the first comb filter 1304, second comb filter 1305 and band-pass filter 1306 in response to the output signal of the correlation circuit 1303 to output an output signal of the filter thus selected, a high-pass filter 1308 for removing the low frequency component from the output signal of the selected filter, a subtractor 1309 for subtracting an output signal of the high-pass filter 1308 from the output signal of the first delay circuit 1301, a chrominance signal output terminal 1310 for outputting the output signal of the high-pass filter 1308, and a luminance signal output terminal 1311 for outputting an output signal of the subtractor 1309.

The luminance signal and chrominance signal separating apparatus as arranged above is applied at its input terminal 1300 with an NTSC signal. Here, suppose that this input signal is expressed as S1, the output signal of the first delay circuit 1301 is expressed as S2 and the output signal of the second delay circuit 1302 is expressed as S3. The first comb filter 1304 subtracts S1 from S2 to output C1 including the chrominance signal and low frequency luminance signal. The second comb filter 1305 subtracts S2 from S3 to output a signal C2 including the chrominance signal and low frequency luminance signal. The band-pass filter 1306 outputs a signal C3 having the frequency band in the vicinity of the color subcarrier.

The correlation detector detects the correlation of S2 and S1 and that of S2 and S3 to output a signal indicating the optimum filter to the selection circuit. The detection of the correlations and the selection of the optimum filter are carried out, for example, as below.

The absolute values of respective high frequency components of S1, S2 and S3 are compared, and in the case where the amplitude difference between S2 and S1 is small, judgment is made so that S1 and S2 are highly correlated and the first comb filter 1304 is considered the optimum filter. On the other hand, in the case where the amplitude difference between S2 and S3 is small, judgment is made so that the second comb filter 1305 is considered the optimum filter. Also, in either case, if the amplitude difference exceeds a predetermined threshold, judgment is made so that there is no correlation of S2 with both S1 and S3 and the band-pass filter 1306 is considered the optimum filter. The selection circuit 1307 selects the optimum filter in response to the output signal of the correlation circuit 1303, and the low frequency component of an output signal of the selected filter 1308 is removed through the high-pass filter to obtain a chrominance signal to be outputted from the chrominance signal output terminal 1310. In addition, the luminance signal is obtained by subtracting the chrominance signal from the output signal of the first delay circuit 1301 to be outputted from the luminance signal output terminal 1311.

With the conventional luminance signal and chrominance signal separating apparatus as structured above, however, if an oblique-stripe luminance signal having a high frequency band is inputted, it is judged that there is no correlation between upper and lower lines, thus causing the band-pass filter 1306 to be selected as the optimum filter. However, the application of the band-pass filter 1306 for such a signal may cause a problem in that the high frequency component of the luminance signal is lost to dim the picture or to be crossed into the chrominance signal to cause a cross color to be generated.

In order to solve these problems, a second example of a conventional luminance signal and chrominance signal separating apparatus has been and is shown in FIG. 14 proposed. This apparatus includes a first delay circuit 1401 for delaying an input signal applied to an input terminal 1400 by one line, a second delay circuit 1402 for delaying an output signal of the first delay circuit 1401 by one line further, a first multiplier 1403 for multiplying the input signal by $-\frac{1}{4}$, a second multiplier 1404 for halving the output signal of the first delay circuit 1401, a third multiplier 1405 for multiplying an output signal of the second delay circuit 1402 by $-\frac{1}{4}$, a first adder 1406 for summing the values obtained by the first to third multipliers, a band-pass filter 1407 for filtering the frequency band in the vicinity of the color subcarrier in the output signal of the first adder 1406, an one field delay circuit 1408 for delaying the output signal of the first delay circuit 1401 by one field, a second adder 1409 for adding the output signal of the first delay circuit 1401 and an output signal of the one field delay circuit 1408, a trap circuit 1410 for suppressing a signal having the frequency band in the color subcarrier in an output signal of the second adder 1409, a high-pass filter 1411 for filtering the high frequency component of an output signal of the trap circuit 1410, an absolute value circuit 1412 for obtaining the absolute value of an output signal of the high-pass filter 1411, an amplitude comparator 1413 for comparing an output signal of the absolute value circuit 1412 with a predetermined threshold TH, an amplitude limiter 1414 for limiting an output signal of the band-pass filter 1407 in response to an output value of the amplitude comparator 1413, a chrominance signal output terminal 1415 for outputting an output signal of the amplitude limiter 1414 as the chrominance signal, a subtractor 1416 for subtracting an output signal of the amplitude limiter 1414 from the output signal of the first delay circuit 1401, and a luminance signal output terminal 1417 for outputting an output signal of the subtractor 1416 as the luminance signal.

With the conventional luminance signal and chrominance signal separating apparatus as shown above, when an NTSC signal is inputted through the input terminal 1400, it is delayed through the first and second delay circuits, 1401 and 1402 and then subjected to multiplications respectively by the first to third multipliers 1403–1405 and summed up by the first adder 1406. This is of a comb filter structure to output the chrominance signal. This chrominance signal is sent to the band-pass filter 1407 to take out the signal having the frequency component in the vicinity of the color subcarrier.

The output signal of the first delay circuit 1401 is also inputted to the one field delay circuit 1408. The output signals of the first delay circuit 1401 and one field delay circuit 1408 are added up by the second adder 1409. The color subcarrier which is subjected to delay of one field is opposite in phase to that which is not subjected thereto, so that the carrier chrominance signal is canceled from the output signal of the second adder 1409.

The output signal of the second adder 1409 is subjected to suppression of the frequency component in the vicinity of the color subcarrier in the trap circuit 1410. The output signal of the trap circuit 1410 is inputted to the high-pass filter 1411 to output the high frequency component signal. The output signal of the high-pass filter 1411 is inputted to the absolute value circuit 1412 to take the absolute value thereof. The output signal of the absolute value circuit 1412 is compared with a predetermined reference value TH in the amplitude comparator 1413 to output the difference thereof. The amplitude limiter 1414 receives the output signal of the bond-pass filter 1407 and the output signal of the amplitude comparator 1413 to limit the amplitude of the signal received from the bond-pass filter 1407 in response to the signal received from the amplitude comparator 1413. The output signal of the amplitude limiter 1414 is subtracted from the output signal of the first delay circuit 1401 in the subtractor 1416 and outputted from the luminance signal output terminal 1417.

The operation for the input signal including a high frequency luminance signal will be explained below. In the case where the luminance signal has a high frequency component, the output signal of the high-pass filter 1411 also includes the high frequency component and the output value of the absolute value circuit 1412 is increased so as to be larger than the predetermined threshold TH in the amplitude comparator 1413. As a result, unnecessary components to be mixed into the chrominance signal are suppressed in the amplitude limiter 1414 to prevent the generation of cross color.

However, with the conventional luminance signal and chrominance signal separating apparatus of the second example as explained above, when a moving picture signal is inputted, in spite of the fact that there is no leakage entrance of high frequency components from the luminance signal into the chrominance signal, the second adder 1409 outputs a signal and as a result, a problem may arise in that the chrominance signal is suppressed despite the lack of mixture of the high frequency components of the luminance signal into the chrominance signal in the amplitude limiter 1414.

SUMMARY OF THE INVENTION

An object of this invention is to provide a luminance signal and chrominance signal separating apparatus having less crosstalk between the luminance signal and chrominance signal.

A luminance signal and chrominance signal separating apparatus of this invention comprises: high-pass filter means for filtering a high frequency component from an input composite video signal; phase calculation means for calculating a phase of the filtered high frequency component signal; delay means for delaying an output signal of the phase calculation means by a predetermined period of time; phase difference calculation means for calculating a difference between an output signal of the phase calculation means and an output signal of the delay means to output a phase difference thereof; correction means for limiting an amplitude of an output signal of the high-pass filter means in response to an output signal of the phase difference calculation means; a chrominance signal output terminal for outputting an output signal of the correction means as a chrominance signal; subtractor means for subtracting the chrominance signal from the input composite video signal; and a luminance signal output terminal for outputting an output signal of the subtractor means as a luminance signal. Using the phase information on the chrominance signal separated from the composite video signal, the chrominance signal thus separated is judged to be the original one or a signal that is crossed with the luminance signal, thus being capable of removing the signal crossed with the luminance signal.

BRIEF DESCRIPTION OF THE DRAWINGS

FIG. 5 is an explanatory diagram of a phase calculation.

FIG. 6 is an explanatory diagram of a phase correction operation.

FIG. 7 is an explanatory diagram of the operation of a chrominance signal correction circuit.

FIG. 8 is an explanatory diagram of a first phase storage circuit.

FIG. 9 is an explanatory diagram of a second phase storage circuit.

FIG. 10 is an explanatory diagram of a phase correction.

FIG. 11 is an explanatory diagram of a chrominance signal correction circuit.

FIG. 12 is an explanatory diagram of the operation of a selection circuit.

DESCRIPTION OF THE PREFERRED EMBODIMENTS

Figure 1:
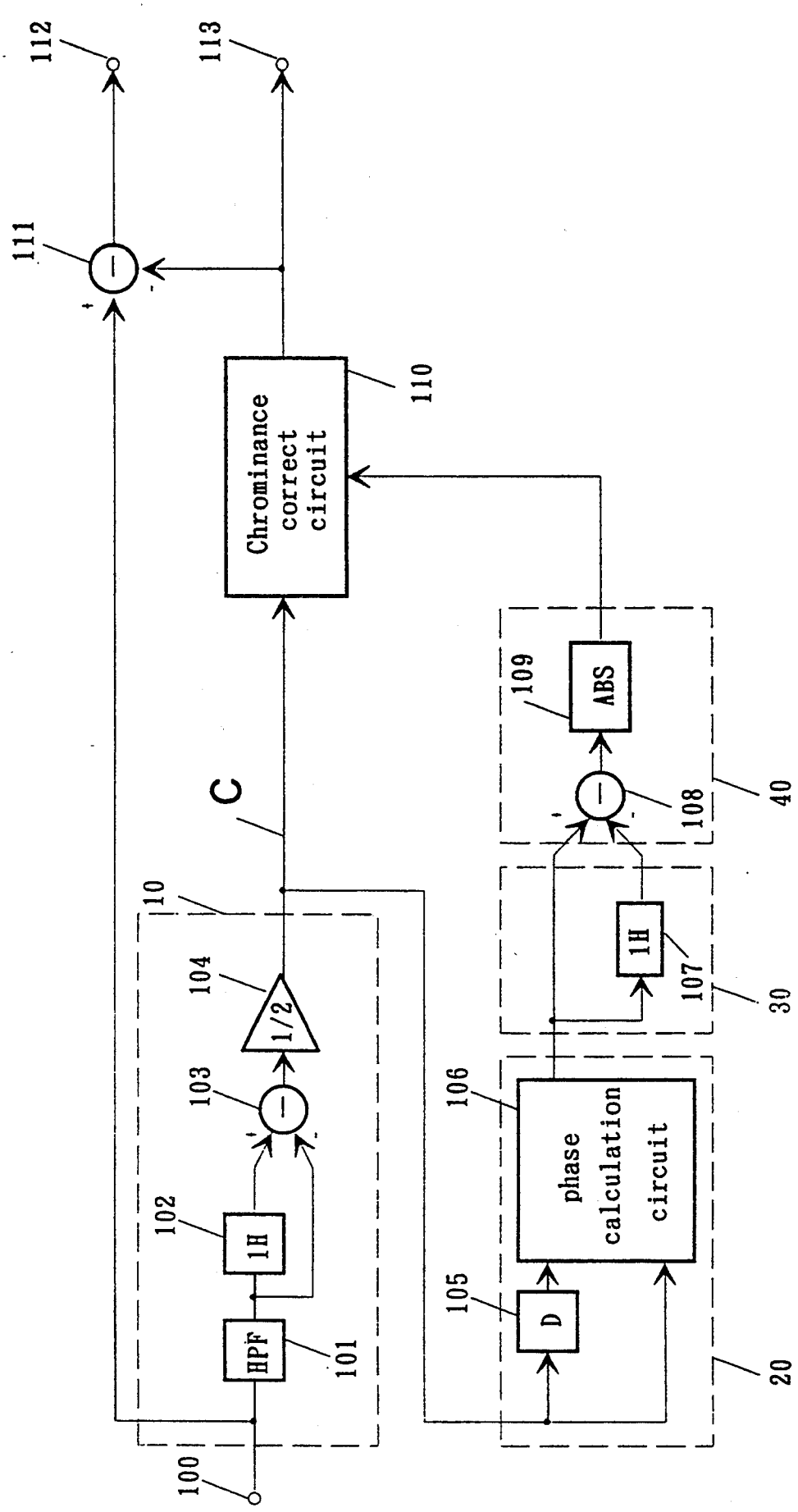
FIG. 1 is a block diagram of a luminance signal and chrominance signal separating apparatus according to a first embodiment of this invention.

FIG. 1 is a block diagram of a luminance signal and chrominance signal separating apparatus according to a first embodiment of this invention. In FIG. 1, a terminal 100 is a composite video signal input terminal, a comb filter 10 separates a luminance signal and a chrominance signal, and a high-pass filter 101 passes the high frequency component having the frequency band of a color subcarrier of the composite video signal. An one line delay circuit 102 delays an output signal of the high-pass filter by one horizontal scanning period (one line). A subtractor 103 calculates a difference between an output signal of the high-pass filter 101 and an output signal of the delay circuit 102, and a multiplier 103 halves an output signal of the subtractor 103. A calculation circuit 20 calculates a phase of the chrominance signal, in which a circuit 105 is an one sample delay circuit and a circuit 106 is a phase calculation circuit. A delay circuit 30 delays the output signal of the calculation circuit 20, in which a one line delay circuit 107 delays an output signal of the phase calculation circuit 106 by one line. A phase difference calculation circuit 40 calculates and outputs a phase difference between the output signal of the phase calculation circuit 106 and an output signal of the one line delay circuit 107. A circuit 108 is a subtractor and a circuit 109 is an absolute value circuit for taking an absolute value. A chrominance signal correction circuit 110 corrects a chrominance signal output of the separating circuit 10 in response to an output of the phase difference calculation circuit 40. A subtractor 111 subtracts an output signal of the chrominance signal correction circuit 110 from the input composite video signal. A terminal 112 is a luminance signal output terminal, and a terminal 113 is a chrominance signal output terminal for outputting the corrected chrominance signal.

With the luminance signal and chrominance signal separating apparatus of the first embodiment arranged as above, if an NTSC signal having been sampled by a quadruple frequency (4 fsc) of the color subcarrier (fsc; 3.58 MHz) is inputted from the input terminal 100, it is separated into the luminance signal and the chrominance signal by the comb filter 10. The operation thereof will be explained below. The high-pass filter 101 passes therethrough the signal having the high frequency band in the vicinity of the frequency of the color carrier. The high-pass filter 101 may comprise, for example, a finite impulse response (FIR) filter having the coefficients of ½, 0 and −½. The output signal of the high-pass filter 101 is delayed by one line in the one line delay circuit 102. The output signal of the high-pass filter 101 and the output signal of the one line delay circuit 102 are subjected to subtraction in the subtractor 103. The output signal of the subtractor 103 is sent to the multiplier 104 to be multiplied by ½ and outputted as the chrominance signal.

Phase calculation of the chrominance signal outputted from the comb filter 10 will be explained below. The phase calculation is carried out in the calculation circuit 20 including the phase calculation circuit 106. The output signal of the amplifier 104 is sent to the delay circuit 105 to be delayed by one sample point. The output signal of the multiplier 104 and the output signal of the delay circuit 105 are inputted to the phase calculation circuit 106. Explanations will be made below recording the phase with reference to FIG. 5. FIG. 5(a) shows an output signal of the multiplier 104, in which S indicates the present output signal point of the multiplier 104, R indicates an output signal point of the delay circuit 105 and A indicates the maximum amplitude in the vicinity of the point S. FIG. 5(b) shows the phases at the points S and R.

The phase calculation method will be explained below with reference to FIG. 5(b). If the maximum amplitude of the input signal in the vicinity of the point S is expressed as A and the phase is expressed as $\theta$, the amplitude s at the point S can be given as $$s = A \sin\theta \qquad (1)$$

Since the input video signal has been sampled by the frequency of 4 fsc to make one period of four samples, the one sample delay thereof generates a phase delay of 90 degrees. Since the point R is a point delayed by one sample from the point S, the phase at the point R can be expressed as $(\theta - 90)$ degrees. As a result, the amplitude r at the point R can be given as $$r = A \sin(\theta - 90) = -A \cos\theta \qquad (2)$$

Dividing Equation (1) by Equation (2), $$s/r = -A \sin\theta / A \cos\theta = -\tan\theta \qquad (3)$$

Solving Equation (3) for $\theta$, the following solution can be obtained:

$$\theta = -\arctan(s/r) \qquad (4)$$

Here, s and r denote the amplitudes at the points S and R, respectively, so that $\theta$ can be obtained by substituting the data values of the points S and R directly into Equation (4).

Since the $\theta$ thus obtained ranges from $-90$ to $90$ degrees, it is converted from zero to 360 degrees, as explained below with reference to FIG. 6. FIG. 6(a) shows one part of the chrominance signal, in which the points A to G are respectively different in phase by a multiple of 90 degrees. FIGS. 6(a) to 6(e) show respective positions of the sampling points inputted, and if respective positions of the newest sampling points are at 600 to 603, FIG. 6(b) shows the case where the present sampling point 600 is between the points C and D, FIG. 6(c) shows the case where the present sampling point 601 is between the points D and E, FIG. 6(d) shows the case where the present sampling point 602 is between the points E and F, and FIG. 6(e) shows the case where the present sampling point 603 is between the points F and G in FIG. 6(a).

In FIG. 6(b), or in the case that the sampling point 600 is between the points C and D, the phase of the sampling point 600 becomes a value ranging from zero to 90 degrees, so that the value calculated by Equation (4) can be directly employed. In FIG. 6(c), the phase of the input sampling point 601 becomes a value ranging from 90 to 180 degrees, but the value calculated by Equation (4) ranges from $-90$ to zero degree, so that it is necessary to add 180 degrees to the value obtained by Equation (4). In FIG. 6(d), the phase of the input sampling point 602 ranges from 180 to 270 degrees, but the value calculated by Equation (4) ranges from zero to 90 degrees, it being necessary to add 180 degrees thereto. In FIG. 6(e), the phase of the input sampling point 603 ranges from 270 to 360 degrees, but the value calculated by Equation (4) ranges from −90 to zero degree, it being necessary to add 360 degrees thereto. Respective phases of these sampling points are corrected as shown above to be outputted in the range of zero to 360 degrees.

The phase detection circuit 106 may comprise a ROM (Read Only Memory) in which the above-mentioned operations are stored. Namely, in which the output signal of the multiplier 104 and the output signal of the delay circuit 105 become the addresses to output the phases calculated and stored in advance. Also, the phase detection circuit 106 may comprise a digital signal processor (DSP) in order to perform the above-mentioned operation. As a result, the phase of the output signal of the multiplier 104 is outputted from the phase calculation circuit 106.

The output signal of the phase calculation circuit 106 is inputted to the delay circuit 30 to be delayed by one line in the one line delay circuit 107. The output signal of the delay circuit 30 is inputted to the phase difference calculation circuit 40 in which the difference between the output signal of the phase calculation circuit 106 and the output signal of the delay circuit 107 is calculated by the subtractor 108 to thereby output the phase difference between the present point and the point delayed by one line therefrom. The absolute value circuit 109 calculates the absolute value of the output signal of the subtractor 108. Thus, the phase difference calculation circuit 40 outputs the absolute value of the phase difference.

The output signal of the absolute value circuit 109 is sent to the chrominance signal correction circuit 110 in which the chrominance signal output of the separating filter 10 is corrected using the output value of the phase difference calculation circuit 40, or the absolute value of the phase difference. The operation of the chrominance signal correction circuit 110 will be explained with reference to FIG. 7, in which FIG. 7(*a*) shows chrominance signal outputs of the separating filter 10 of two adjacent lines in a uniform color picture, in which a point A is the present point and a point B is the point delayed by one line from the point A. FIG. 7(*b*) shows chrominance signal outputs of the separating circuit 10 of two adjacent lines in a picture uniformly having oblique black and white stripes, in which a point C is the present point and a point D is the point delayed by one line from the point C.

As a characteristic of the chrominance signal of NTSC signal, the phase difference between the present point and the point delayed by one line therefrom becomes 180 degrees. Namely, in FIG. 7(*a*), the phase difference between the points A and B just becomes 180 degrees. Referring to the signal that is crossed from the luminance signal into the chrominance signal, however, the phase difference between the upper and lower lines, namely, the phase difference between the points C and D shown in FIG. 7(*b*) may not always become 180 degrees.

Accordingly, when the output value of the phase difference calculation circuit 40 is in the vicinity of 180 degrees, the chrominance signal correction circuit 110 directly outputs the chrominance signal output of the separating circuit 10, and when it is not in the vicinity of 180 degrees, the output value thereof is the signal crossed from the luminance signal thereinto, so that the output chrominal signal of the separating filter 10 is attenuated. This output signal is outputted from the chrominance output terminal 113. The chrominance signal correction circuit 110 may comprise a switching circuit through which the output signal of the separating circuit 10 is binarily passed or cut-off in response to the output signal of the phase difference calculation circuit 40. Preferably, it may comprise a ROM or DSP in which the output signal of the separating filter 10 is attenuated by multiplication in response to the output signal of the phase difference calculation circuit 40.

The output signal of the chrominance signal correction circuit 110 is sent to the subtractor 111 to be subtracted from the input composite video signal to thereby obtain the luminance signal which is outputted from the luminance signal output terminal 112.

Figure 2:
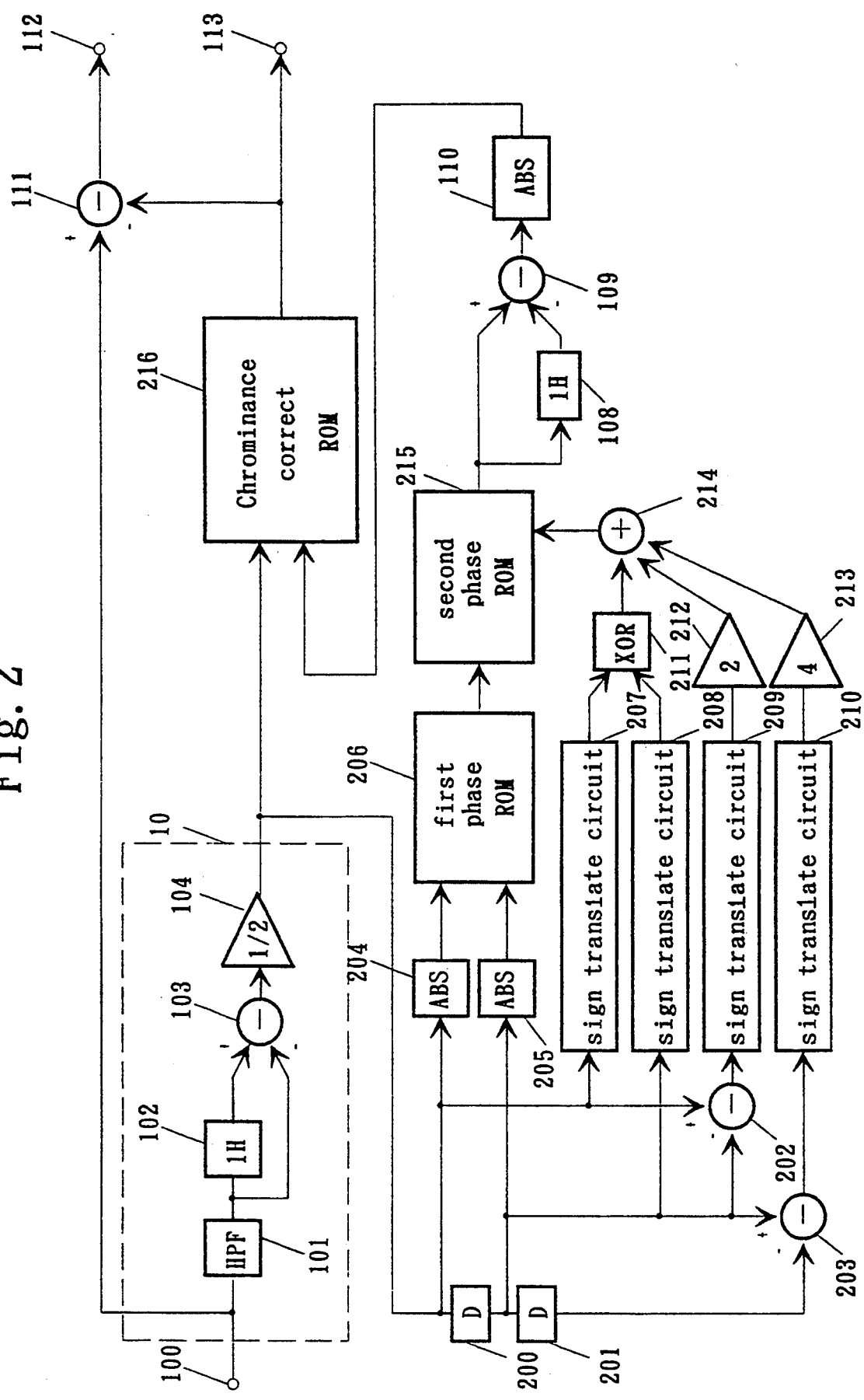
FIG. 2 is a block diagram of a luminance signal and chrominance signal separating apparatus according to a second embodiment of this invention.

FIG. 2 is a block diagram of a luminance signal and chrominance signal separating apparatus according to a second embodiment of this invention, in which detailed explanations are omitted with respect to the members having the same reference numerals as in the first embodiment because their functions are the same.

In FIG. 2, a delay circuit 200 delays an output signal of the separating filter 10 by one sample, and a delay circuit 201 delays an output signal of the delay circuit 200 by one sample. A subtractor 202 calculates and outputs the difference between the output signal of the separating circuit 10 and the output signal of the delay circuit 200, and a subtractor 203 calculates and outputs the difference between the output signal of the delay circuit 200 and the output signal of the delay circuit 201. An absolute value circuit 204 takes and outputs the absolute value of the output signal of the separating filter 10. An absolute value circuit 205 outputs the absolute value of the output signal of the delay circuit 200. A first phase storage circuit 206 receives the output signals of the absolute value circuits 204 and 205 and outputs the phase of the output signal of the separating filter 10 in the range of zero to 90 degrees. Sign translating circuits 207 to 210 respectively translate the signs of the output values of the separating filter 10, delay circuit 200, subtractor 202 and subtractor 203 into numerical values. An exclusive OR circuit 211 takes an exclusive OR of the output signals of the sign translating circuits 207 and 208. Multipliers 212 and 213 double and quadruple the output signals of the sign translating circuits 209 and 210, respectively. An adder 214 adds the output signals of the exclusive OR circuit 211 and the multipliers 212 and 213. A second phase storage circuit 215 receives the output signals of the first phase storage circuit 206 and adder 214 and outputs the phase thereof in the range of zero to 360 degrees. A chrominance signal correction storage circuit 216 corrects the output signal of the separating filter 10 in response to the output signal of the absolute value circuit 110 to thereby obtain the chrominance signal. A subtractor 111 subtracts the output signal of the chrominance signal correction storage circuit 216 from the input composite video signal to thereby obtain the luminance signal.

With the luminance signal and chrominance signal separating apparatus according to the second embodiment as shown above, the output signal of the multiplier 104 and the output signal of the first delay circuit 200 are sent to the absolute value circuits 204 and 205 to output the absolute values, respectively. The output signals of the absolute value circuits 204 and 205 are inputted to the first phase storage circuit 206. In the first phase storage circuit 206, the phase of the output signal of the separating filter 10 is obtained and outputted in the range of zero to 90 degrees, which will be explained below with reference to FIG. 8. FIG. 8 shows a ROM in which the results obtained by applying Equation (4) to the input signals from the absolute value circuits 204 and 205 are shown and through which the stored values are outputted with the input signals from the absolute value circuits 204 and 205 as the addresses. Here, the input signal to the first phase storage circuit 206 is positive, and the result obtained by applying Equation (4) is positive, so that the phase of the output signal of the separating circuit 10 is outputted in the range of zero to 90 degrees.

When the output signals of the multiplier 104 and delay circuit 200 are inputted respectively to the sign translating circuits 207 and 208, if the input value is positive, zero (0) is outputted and if it is negative, one (1) is outputted. The subtractor 202 obtains the difference between the output signal of the multiplier 104 and the output signal of the delay circuit 200, and the subtractor 203 obtains the difference between the output signal of the delay circuit 200 and the output signal of the delay circuit 201. The differences thus obtained are sent respectively to the sign translating circuits 209 and 210. The sign translating circuits 209 and 210 each outputs zero (0) if the input value is positive, and outputs one (1) if the input value is negative.

The output signals of the sign translating circuits 207 and 208 are sent to the exclusive OR circuit 211. The output signal of the sign translating circuit 209 is doubled by the multiplier 212 and the output signal of the sign translating circuit 210 is quadrupled by the multiplier 213. The output signals of the multipliers 212 and 213 and the exclusive OR circuit 211 are added by the adder 214 to obtain the output values of zero (0) to seven (7).

In the second phase storage circuit 215, the output signal of the first phase storage circuit 206 is corrected in response to the output signal of the adder 214 as shown in FIG. 9. In FIG. 9, p shows the output value of the first phase storage circuit 206. The correction principle will be explained below with reference to FIG. 10 which shows a chrominance signal and in which the black dots • show the phase different points of a multiple of 45 degrees. The numerical values of 0 to 7 show the output values of the adder 214 when the noticing point is positioned into respective sections. In FIG. 10, the case that the noticing point is made P and it is, for example, between the points F and G will be discussed below. If the point where the point P is delayed by one sample is made Q, and the point where the point P is delayed by two samples is made R, the point Q is between the points D and E and the point R is between the points B and C. The output signal of the subtractor 203 indicates the slope between the points Q and R, the output signal of the subtractor 202 indicates the slope between the points P and Q, and the both output signals are positive in sign, so that the sign translating circuits 209 and 210 respectively output zero (0). The sign translating circuits 207 and 208 receive the values at the points P and Q, respectively, and in this case, the point P shows a positive value and the point Q shows a negative value, so that zero (0) and one (1) are outputted respectively therefrom and the exclusive OR circuit 212 outputs one (1). Thus, the adder 214 receives the values of 1, 0 and 0, thus outputting the value of 1. This output value corresponds to the description saying "Input from 214" in FIG. 9. The second phase storage circuit 215 stores the numerical values obtained by adding the values as shown in FIG. 9 to the output values of the first phase storage circuit 206 in response to the output signal of the adder 214 and outputs the numerical values thus stored with the output signals of the first phase storage 206 and adder 214 as the addresses. This output value is in the range of 0 to 360 degrees as already explained above.

The output signal of the second phase storage circuit 215 is subjected to the calculation of the phase difference between the lines through the circuits 108 to 110 and the calculated result is inputted to the chrominance signal correction storage circuit 216. As shown in FIG. 11, the chrominance signal correction storage circuit 216 may comprise a ROM in which the numerical values stored are outputted with the output signals of the multiplier 104 and absolute value circuit 110 as the addresses. The numerical values in the ROM of the chrominance signal correction storage circuit 216 will be explained below. In FIG. 11, if the address by the output signal of the absolute value circuit 110 is in the vicinity of 180 degrees, the chrominance signal correction storage circuit 216 directly stores the numerical values of the multiplier 104, and as the output signal of the absolute value circuit 110 is apart from the angle of 180 degrees, it stores the numerical values obtained by attenuating the output values of the multiplier 104. The output signal thereof is the chrominance signal and outputted from the terminal 113, and subtracted from the input composite video signal by the subtractor 111 and outputted from the terminal 112 as the luminance signal.

Figure 3:
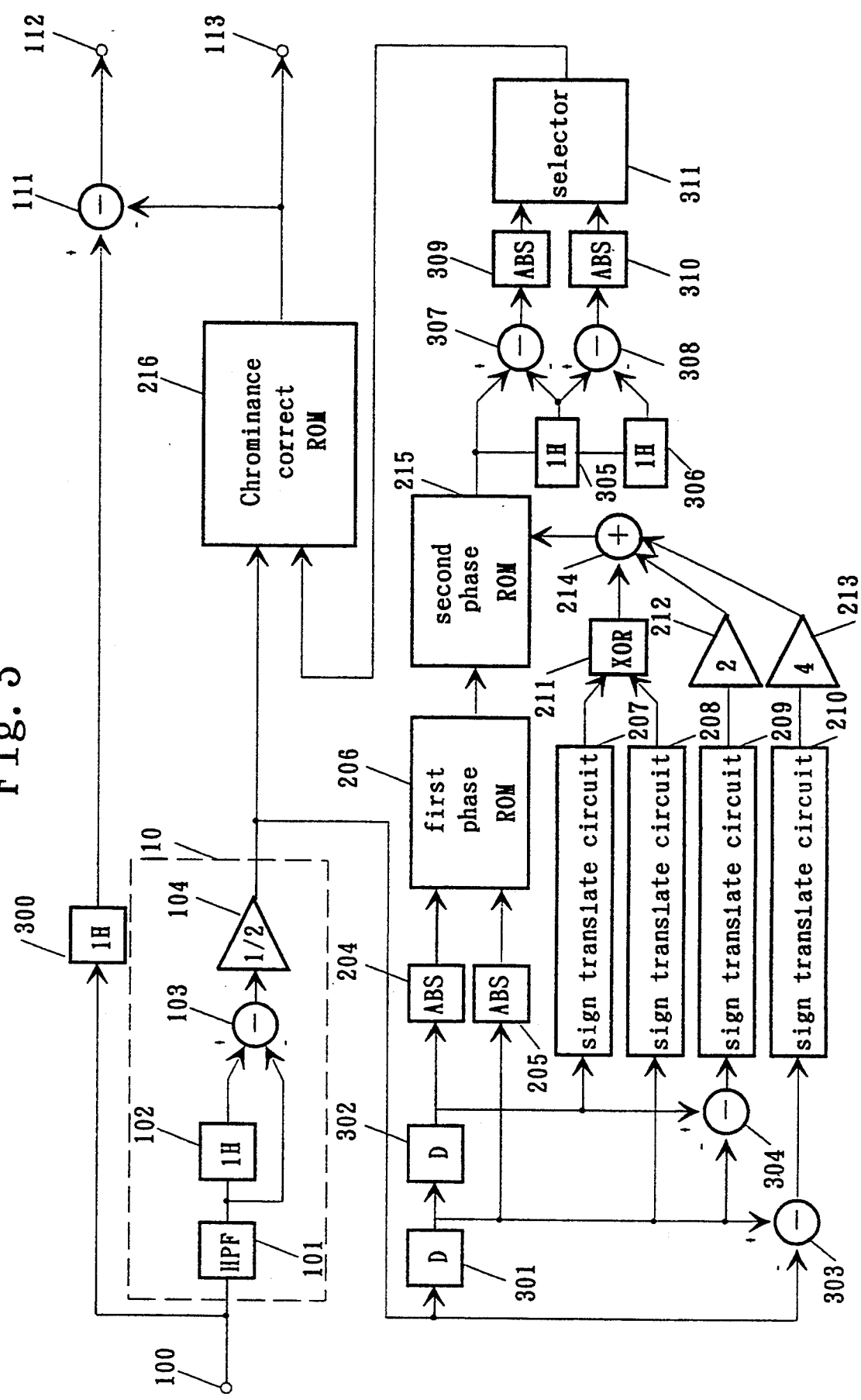
FIG. 3 is a block diagram of a luminance signal and chrominance signal separating apparatus according to a third embodiment of this invention.

FIG. 3 is a block diagram of a luminance signal and chrominance signal separating apparatus according to a third embodiment of this invention, in which detailed explanations are omitted with respect to the members having the same reference numerals as in FIGS. 1 and 2 because their functions are the same.

In FIG. 3, a delay circuit 300 delays the input signal by one line, a delay circuit 301 delays an output signal of the separating filter 10 by one sample, and a delay circuit 302 delays on output signal of the delay circuit 301 by one sample. A subtractor 303 subtracts the output signal of the delay circuit 301 from the output signal of the separating filter 10. A subtractor 304 subtracts an output signal of the delay circuit 302 from the output signal of the delay circuit 301. A delay circuit 305 delays an output signal of the second phase storage circuit 215 by one line, and a delay circuit 306 delays an output signal of the delay circuit 305 by one line. A subtractor 307 subtracts the output signal of the delay circuit 305 from the output signal of the second phase storage circuit 215, and a subtractor 308 subtracts an output signal of the delay circuit 306 from the output signal of the delay circuit 305. An absolute value circuit 309 takes the absolute value of an output signal of the subtractor 307, and an absolute value circuit 310 takes the absolute value of an output signal of the subtractor 308. A selector circuit 311 selects and outputs a nearer one to 180 degrees of the output signals of the absolute value circuits 309 and 310.

With the luminance signal and chrominance signal separating apparatus of the third embodiment as shown above, the output signal of the second phase storage circuit 215 is delayed by one line in the delay circuit 305 and further delayed by one line in the delay circuit 306. The subtractor 307 subtracts the output signal of the delay circuit 305 from the output signal of the second phase storage circuit 215 and the subtractor 308 subtracts the output signal of the delay circuit 306 from the output signal of the delay circuit 305, the results being sent to the absolute value circuits 309 and 310 to obtain the absolute values, respectively. The output signals of the absolute value circuits 309 and 310 are sent to the selector circuit 311. The operation of the selector circuit 311 will be explained below with reference to FIG. 12. FIG. 12 shows the state that a uniform chrominance signal is varied in one line, in which the point R in FIG. 12(c) shows a chrominance signal that is inputted at present, the point Q in FIG. 12(b) shows the chrominance signal that the point R is delayed by one line and the point P in FIG. 12(a) shows the chrominance signal that the point R is delayed by two lines, showing that the color change is made between the states of FIGS. 12(a) and (b). The output signal of the absolute value circuit 309 is the phase difference between the points Q and R, and the output signal of the absolute value circuit 310 is the phase difference between the points P and Q. The noticing point is the point Q, and in this case, the phase difference between the points P and Q is apart from 180 degrees, but the phase difference between the points Q and R is 180 degrees. The selector circuit 311 selects and outputs a nearer one to 180 degrees of the phase differences between the points Q and R and between the points P and Q. Namely, in FIG. 12, from the selector circuit 311, the phase difference between the points Q and R is outputted. Thus, the selector circuit 311 makes possible to prevent the attenuation of the original chrominance signal even when the color change is occurred.

Preferably, by being provided with a plurality of one sample delay circuits additionally to the delay circuits 305 and 306, the attenuation of the original chrominance signal can be prevented even when the lateral color change is occurred.

Figure 4:
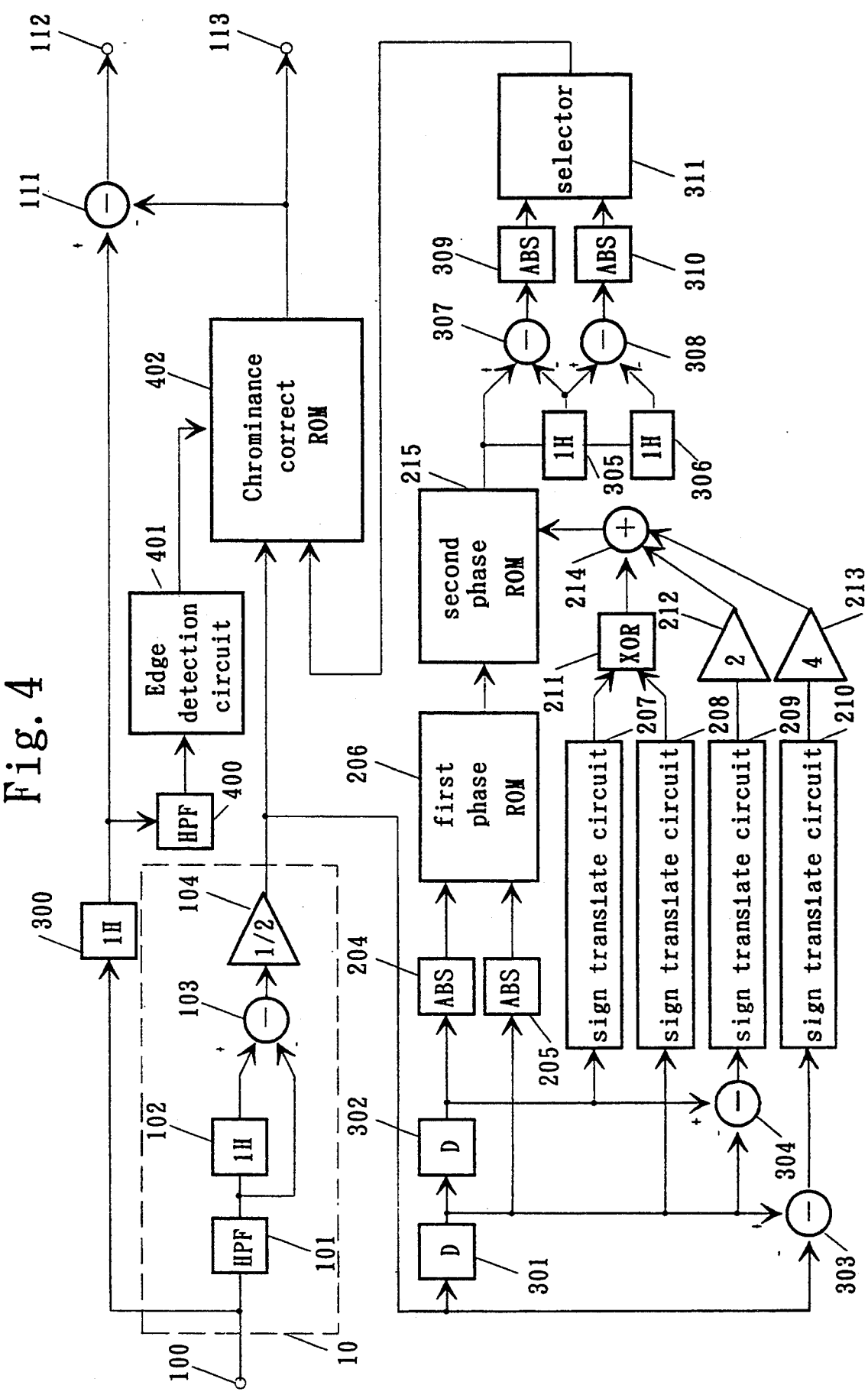
FIG. 4 is a block diagram of a luminance signal and chrominance signal separating apparatus according to a fourth embodiment of this invention.
Figure 13:
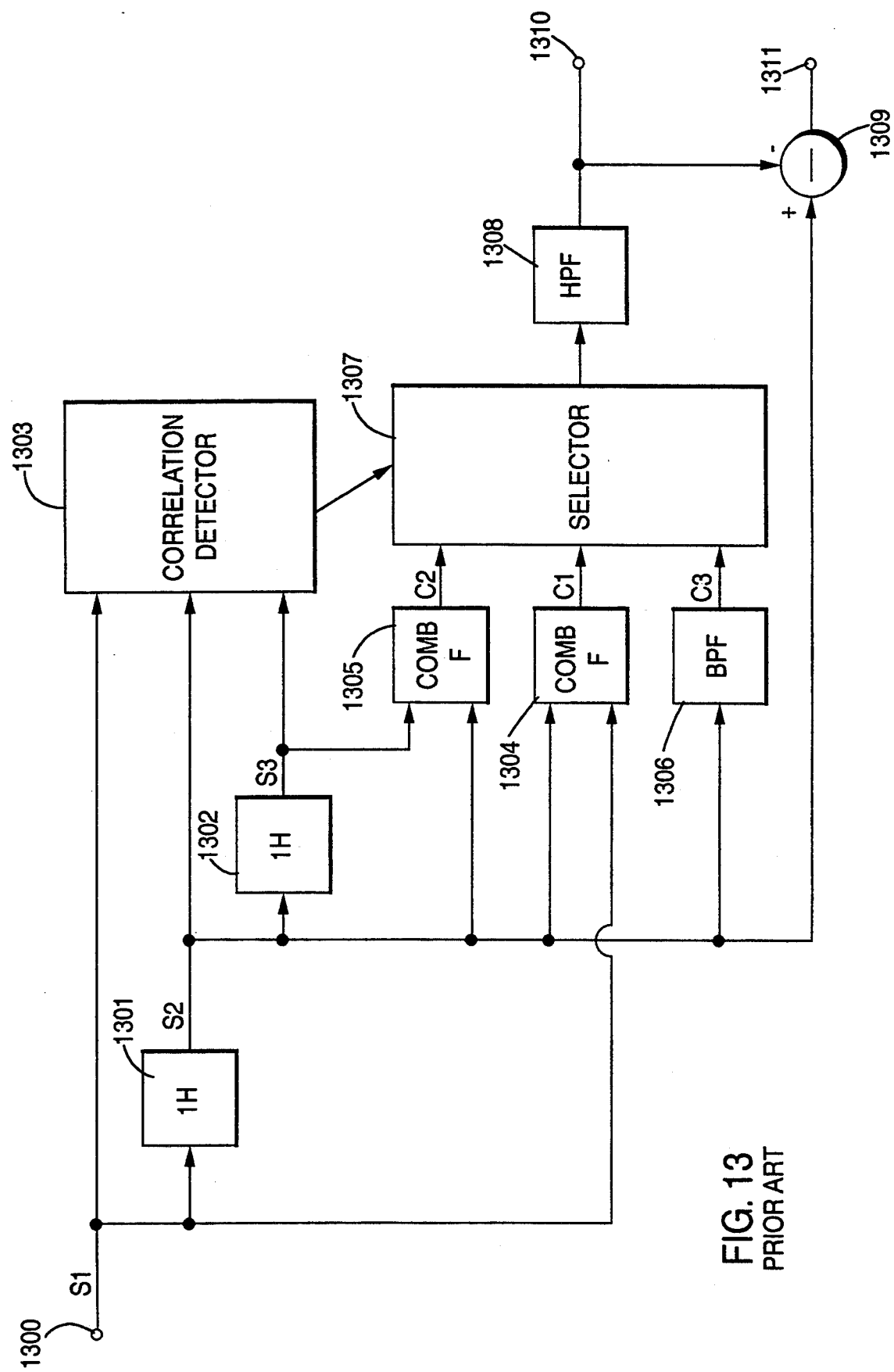
FIG. 13 is a block diagram of a first example of a conventional luminance signal and chrominance signal separating apparatus.
Figure 14:
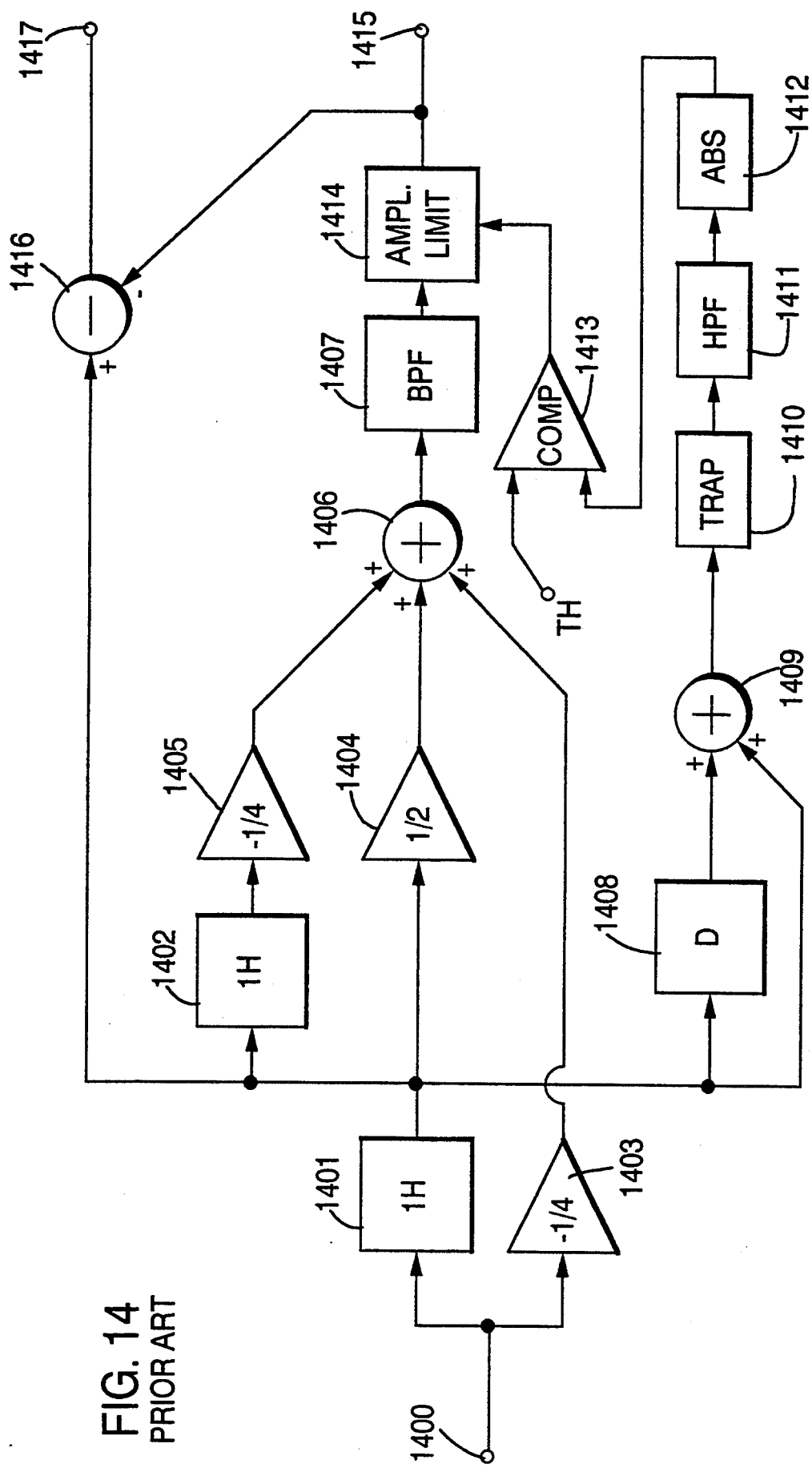
FIG. 14 is a block diagram of a second example of a conventional luminance signal and chrominance signal separating apparatus.

FIG. 4 is a block diagram of a luminance signal and chrominance signal separating apparatus according to a fourth embodiment of this invention. Detailed explanations will be omitted for the members having he same reference numerals as in the first, second and third embodiments because of their functions are the same.

In FIG. 4, a high-pass filter 400 passes therethrough the high frequency component of the input composite video signal, and an edge detection circuit 401 samples an edge of the luminance signal of the input composite video signal. The chrominance signal correction storage circuit 402 corrects the output signal of the separating filter 10 in response to the output signal of the selector circuit 311 and an output signal of the edge detection circuit 401 and outputs the chrominance signal.

With the apparatus as shown above, the input video signal is sent to the high-pass filter 400 (for example, FIR filter having the coefficients of $-\frac{1}{4}$, 0, $\frac{1}{2}$, 0, and $-\frac{1}{4}$) to pass the high frequency component thereof.

The correction of the output signal of the separating filter 10 in the chrominance signal correction storage circuit 402 is carried out substantially in the same way as in the chrominance signal correction storage circuit 216 explained in the third embodiment. Namely, if the phase difference outputted from the selector circuit 311 is in the vicinity of 180 degrees, the output signal of the separating filter 10 is directly passed therethrough, and if it is not in the vicinity of 180 degrees, it is attenuated. In this embodiment, however, if the output signal of the edge detection circuit 401 exceeds a predetermined threshold, the chrominance signal correction storage circuit 402 directly outputs the output signal of the separating filter 10 independently of the output signal of the selector circuit 311. Consequently, the crosstalk (dot cross) of the luminance signal into the chrominance signal which would appear in the vicinity of an edge can be prevented.

What is claimed is:

1. A luminance signal and chrominance signal separating apparatus comprising:

separating means for separating a luminance signal and a chrominance signal from an input composite video signal;

phase calculation means for calculating a phase of the chrominance signal from the separating means;

delay means for delaying an output signal of the phase calculation means by a predetermined period of time;

phase difference calculation means receiving an output signal of the delay means and the output signal of said phase calculation means for calculating a phase difference therebetween;

chrominance signal correction means for attenuating the chrominance signal from said separating means in response to an output signal of the phase difference calculation means;

subtractor means for subtracting an output signal of said chrominance signal correction means from the input composite video signal;

luminance signal output means for outputting an output signal of the subtractor means as an output luminance signal; and chrominance signal output means for outputting the output signal of said chrominance signal correction means as an output chrominance signal.

2. A luminance signal and chrominance signal separating apparatus comprising:

a separating circuit for separating a luminance signal and a chrominance signal from an input composite video signal;

a phase calculation circuit for calculation a phase of the chrominance signal from the separating circuit;

a delay circuit for delaying an output signal of the phase calculation circuit by a predetermined period of time;

a phase difference calculation circuit receiving the output signal of said phase calculation circuit and an output signal of the delay circuit for calculating a phase difference therebetween;

a chrominance signal correction circuit for attenuating said chrominance signal in response to an output signal of the phase difference calculation circuit;

a subtractor for subtracting an output signal of the chrominance signal correction circuit from said input composite video signal;

a luminance signal output terminal for outputting an output signal of the subtractor as an output luminance signal; and a chrominance signal output terminal for outputting the output signal of said chrominance signal correction circuit as an output chrominance signal.

3. A luminance signal and chrominance signal separating apparatus comprising:

a separating filter for separating a luminance signal and a chrominance signal from an input composite video signal;

a first delay circuit for delaying the chrominance signal from the separating filter;

a phase storage circuit which stores all phases that said chrominance signal can take and receives said chrominance delayed by said first delay circuit for outputting a phase;

a second delay circuit for delaying an output signal of the phase storage circuit by a predetermined period of time;

a phase difference calculation circuit for calculating and outputting a difference between a phase of the output signal of said phase storage circuit and a phase of an output signal of said second delay circuit;

a chrominance signal correction storage circuit which stores attenuations of any chrominance signal outputted from said separating filter in response to an output signal of two phase difference calculation circuit for outputting a chrominance signal in response to the output signal of said phase difference calculation circuit and the output signal of said separating circuit;

a first subtractor circuit for subtracting an output signal of said chrominance signal correction storage circuit from the input composite video signal;

a luminance signal output terminal for outputting an output signal of the first subtractor as an output luminance signal; and a chrominance signal output terminal for outputting the output signal of said chrominance signal correction storage circuit as an output chrominance signal.

4. The apparatus as claimed in claim 3, wherein said phase storage circuit comprises:

a first phase storage circuit for storing a part of phase values that said chrominance signal can take;

a second subtractor circuit for obtaining a difference between said chrominance signal from the separating filter and the output signal of said first delay circuit; and a second phase storage circuit for storing corrected values with respect to values stored in said first phase storage circuit in advance in response to an output of the second subtractor and the output of said first delay circuit.

5. The apparatus as claimed in claim 4, wherein said second delay circuit comprises a plurality of one line delay circuits, and said phase difference calculation circuit calculates a plurality of phase differences.

6. The apparatus as claimed in claim 5, further comprising an edge detection circuit for detecting an edge from the input composite video signal, wherein said chrominance signal correction circuit directly outputs the chrominance signal from said separating filter in response to an output signal of said edge detection circuit.

* * * * *